United States Patent [19]

Nagano et al.

[11] 4,388,202

[45] Jun. 14, 1983

[54] LUBRICATING OIL COMPOSITION AND PROCESS FOR PREPARATION THEREOF

[75] Inventors: Riichiro Nagano, Yamaguchi; Ryosuke Kaneshige, Ichihara, both of Japan

[73] Assignee: Mitsui Petrochemical Industries, Ltd., Tokyo, Japan

[21] Appl. No.: 196,913

[22] PCT Filed: Nov. 13, 1979

[86] PCT No.: PCT/JP79/00289

§ 371 Date: Jul. 14, 1980

§ 102(e) Date: Jul. 14, 1980

[87] PCT Pub. No.: WO80/00976

PCT Pub. Date: May 15, 1980

[30] Foreign Application Priority Data

Nov. 14, 1978 [JP] Japan ................ 53-139359
Nov. 14, 1978 [JP] Japan ................ 53-139362

[51] Int. Cl.$^3$ ............................. C10M 1/28
[52] U.S. Cl. .......................... 252/52 A; 252/52 R; 252/56 R; 585/12
[58] Field of Search ............ 252/52 R, 52 A, 56 R; 585/12

[56] References Cited

U.S. PATENT DOCUMENTS

| | | | |
|---|---|---|---|
| 2,837,496 | 6/1958 | Vandenberg | 252/52 R X |
| 2,901,458 | 8/1959 | Banes et al. | 252/56 R X |
| 2,965,571 | 12/1960 | Wuellner et al. | 252/56 R X |
| 3,089,832 | 5/1963 | Black et al. | 252/51.5 R X |
| 3,264,216 | 8/1966 | Rockett | 252/52 R X |
| 3,404,091 | 10/1968 | Takashima et al. | 252/56 R X |
| 3,642,635 | 2/1972 | MacLeod | 252/56 R X |
| 3,687,849 | 8/1972 | Abbott | 252/52 R X |
| 3,929,800 | 12/1975 | Horowitz | 252/52 R X |

FOREIGN PATENT DOCUMENTS 53-39305 4/1978 Japan.

*Primary Examiner*—Andrew Metz
*Attorney, Agent, or Firm*—Wenderoth, Lind & Ponack

[57] ABSTRACT

A lubricating oil composition comprising a major proportion of a lubricating oil, and an oil-soluble graft copolymer, said graft copolymer being prepared by grafting a small amount of a grafting monomer selected from saturated esters of unsaturated monocarboxylic acids, unsaturated esters of saturated carboxylic acids and unsaturated epoxy compounds to a trunk copolymer which is substantially free from an oxygen-containing functional group and a carbon-carbon double bond determined from its iodine value and has a number average molecular weight of about 5,000 to about 100,000, said trunk copolymer being selected from copolymers of alpha-olefins having 2 to 20 carbon atoms, copolymers of styrene and alpha-olefins having 2 to 20 carbon atoms and hydrogenated products of copolymers of styrene and diolefins. A process for preparation of said composition is also provided.

20 Claims, No Drawings

LUBRICATING OIL COMPOSITION AND PROCESS FOR PREPARATION THEREOF

FILED OF TECHNOLOGY

This invention relates to a lubricating oil additive having a high viscosity index and superior detergency and dispersing property, a process for production thereof, and a lubricating oil composition containing the aforesaid additive.

BACKGROUND TECHNOLOGY

Polyalkyl methacrylates, polyisobutylene, hydrogenated products of styrene-isoprene copolymer rubber, etc. are currently known in the art to be useful as viscosity index improvers for lubricating oils. These lube oil additives work well in improving the viscosity indices of lube oils, but require the conjoint use of large amounts of detergency and dispersing agent and an antioxidant because for use in inbricating oils for internal combustion engines, such additives are required to have a high level of detergency and antioxidation property so as to prevent deposition of a varnish-like material, sludge and cake-like material on the engines.

Use of olefin copolymers as a lube oil additive is also known. However, the use of high-molecular-weight olefin copolymers in this field of application has the defect that the shear stability of a lubricating oil containing this additive is very poor although an effect of increasing its viscosity is noted.

Because a low-molecular-weight olefin copolymer is difficult to produce commercially, it has generally been suggested to degrade an easily producible high-molecular-weight copolymer to a low-molecular-weight product and to use it as an additive for lubricating oils. To reduce the molecular weight of olefin copolymers, methods comprising degradation with heat, oxygen, air, etc. are known (for example, U.S. Pat. Nos. 3,499,741 and 3,524,732).

Olefin copolymers whose molecular weights are reduced by these known methods have an unsaturated bond or oxygen-containing functional groups such as a hydroxyl, carbonyl or hydroperoxide group. Accordingly, when these copolymers are used as solutions in lubricating oils, they polymerize, decompose, or give excessively oxidized products. This consequently causes the disadvantage that a precipitate is formed, the viscosity of the lubricating oil is markedly increased or at times reduced to render the viscosity unstable. In actual use, therefore, large amounts of a detergency and dispersing agent and an antioxidant must be used together.

On the other hand, when olefin copolymers are used as additives for lube oils, they are still not entirely satisfactory with regard to detergency and dispersing property and oxidation stability although this is not to such an extent as the aforesaid degradation products of olefin copolymers. For example, when an oxidation stability test based on JIS K-2514 is conducted, a great amount of deposit is seen to adhere to a varnish stick. When a panel coking test, which is a coking test well known in the art, is performed, the amount of sludge formed is large. In actual use, therefore, it is necessary to use a detergency and dispersing agent, an antioxidant, etc. conjointly.

For this reason, the development of a multifunctional viscosity index improvers having detergency and dispersing property or an oxidation inhibiting ability and a lubricating oil composition comprising it has been desired in the market, and there has been a strong interest in it.

Thus, improvements have been suggested, for example a method which comprises grafting an oxygen-containing monomer to an olefin copolymer whose molecular weight has been reduced by means of heat and/or oxygen (Japanese Patent Publications Nos. 19112/74 and 28288/76; corresponding to British Pat. No. 1,244,432), a method which comprises grafting a polar monomer having a vinylidene group to the aforesaid copolymer (Japanese Patent Publication No. 42685/73; corresponding to French Pat. No. 68156134), and a method which comprises grafting a nitrogen-containing polar compound to the aforesaid copolymer (Japanese Laid-Open Pat. Publication No. 18705/77).

However, since these known methods require a two-step modifying procedure consisting of the oxidation of the copolymer rubber and then the graft copolymerization, the operation of obtaining a lube oil additive is complicated. Moreover, the modifying reactions have poor reproducibility. Furthermore, in the oxidation stage, a hydroperoxide group or a carbon-carbon double bond, which becomes a cause of degradation, forms on the polymer chain. Thus, in the subsequent grafting reaction, the oxidation product tends to undergo cross-linking and degeneration. Accordingly, the aforesaid properties do not reach entirely satisfactory levels.

As an additive intended for improving the viscosity increasing effect of lube oils, there is also known a viscosity index improver obtained by copolymerizing a vinyl aromatic compound with an acrylate and/or a methacrylate in the presence of an oil-soluble hydrogenated product of a copolymer of a vinyl aromatic compound and a conjugated diolefin (Japanese Laid-Open Pat. Publication No. 39305/78). This viscosity index improver differs from the present invention in that the proportion of the copolymer of vinyl aromatic compound and a conjugated diolefin is low, and the monomers to be post-polymerized (grafted) are not only the acrylate and/or methacrylate but also the vinyl aromatic compound. The viscosity inded improver of this suggestion still leaves room for improvement in viscosity increasing effect and detergency and dispersing property.

As described in detail hereinbelow, the present invention relates to a multi-functional lubricant oil additive, a lubricating oil composition containing it, and to a process for preparation thereof which are different from the conventional compositions and the methods for production thereof.

DISCLOSURE OF THE INVENTION

The present inventors made investigations about a method for improving the detergency and dispersing property or the low temperature viscosity of an oil-soluble alpha-olefin polymer while retaining the advantages of the polymer as a lube oil additive. These investigations have led to the discovery that a method which comprises grafting a grafting monomer selected from saturated esters of unsaturated monocarboxylic acids, unsaturated esters of saturated carboxylic acids and unsaturated epoxy compounds to a specified trunk copolymer in the presence of a radical initiator without degrading the copolymer by oxidation or otherwise.

According to this invention, there is provided a lubricating oil composition comprising an oil-soluble graft copolymer and a major amount of a lubricating oil, said graft copolymer being obtained by grafting a small amount of a grafting monomer selected from the group consisting of saturated esters of unsaturated monocarboxylic acids, unsaturated esters of saturated carboxylic acids and unsaturated epoxy compounds to a copolymer of an alpha-olefin having 2 to 20 carbon atoms, a copolymer of styrene and an alpha-olefin having 2 to 20 carbon atoms, or a hydrogenation product of a copolymer of styrene and a diolefin, said trunk copolymer being substantially free from a carbon-carbon double bond determined from its iodine value and also substantially free from an oxygen-containing functional group and having a number average molecular weight of about 5,000 to about 100,000.

More specifically, this invention relates to a lubricating oil composition comprising a lubricating oil and about 0.5 to about 40% by weight, based on the weight of the lubricating oil, of an oil-soluble graft copolymer prepared by grafting about $10^{-2}$ to about 5 milliequivalents, per gram of the oil-soluble graft copolymer formed, of a grafting monomer selected from the group consisting of
(a) saturated esters of unsaturated monocarboxylic acids,
(b) unsaturated esters of saturated carboxylic acids, and
(c) unsaturated epoxy compounds to a trunk copolymer selected from the group consisting of copolymers of alpha-olefins having 2 to 20 carbon atoms, copolymers of styrene and alpha-olefins having 2 to 20 carbon atoms and hydrogenated products of copolymers of styrene and diolefins, said trunk copolymer having
(i) a number average molecular weight of about 5,000 to about 100,000,
(ii) a carbon-carbon double bond content determined from its iodine value of not more than about 0.1 (milliequivalent/g of copolymer), and
(iii) an oxygen content of not more than about 0.3% by weight; and
to a process for producing said composition.

The oil-soluble graft copolymer contained in the lubricating oil composition of this invention is prepared by grafting a grafting monomer selected from saturated esters of unsaturated monocarboxylic acids, especially the monoalkyl esters, unsaturated esters of saturated carboxylic acids, especially the alkenyl esters, and unsaturated epoxy compounds to a copolymer of alpha-olefins having 2 to 20 carbon atoms, a copolymer of styrene and an alpha-olefin containing 2 to 20 carbon atoms or a hydrogenation product of styrene and a diolefin.

As the trunk copolymer which is a starting material for the graft copolymer, amorphous rubbers are especially suitable which have a number average molecular weight (i) of about 5,000 to about 100,000, preferably about 10,000 to about 60,000 and a melt index at 190° C. of about 0.1 to about 500, especially preferably about 1 to about 100, and a degree of crystallization, determined by an X-ray diffraction method, of substantially 0%, and is substantially free from an endothermic peak determined by differential scanning calorimetry.

The trunk copolymer used in this invention is also required to be substantially free from a carbon-carbon double bond content determined from its iodine value and an oxygen-containing functional group, i.e. have a carbon-carbon double bond content determined by an iodine value method (ii) of not more than about 0.1 (milliequivalent/g of copolymer), and to have an oxygen content (iii) of not more than about 0.3% by weight. As a trunk copolymer having such properties, copolymers directly synthesized by copolymerizing alpha-olefins having 2 to 20 carbon atoms using a polymerization catalyst such as a Ziegler catalyst are preferred.

For example, there may be exemplified rubber copolymers of ethylene and alpha-olefins having 3 to 20 carbon atoms, i.e. ethylene/propylene copolymer, ethylene/1-butene copolymer, ethylene/4-methyl-1-pentene copolymer, ethylene/1-eicosene copolymer, ethylene/propylene/1-butene copolymer, propylene/1-butene copolymer, propylene/4-methyl-1-pentene copolymer, etc.

A copolymer of styrene and 1-butene or a copolymer of styrene and iso-amylene can be preferably cited as the copolymer of styrene and an alpha-olefin having 2 to 20 carbon atoms as the trunk copolymer.

There can also be used a trunk copolymer obtained by hydrogenating a copolymer of styrene and a diolefin to reduce its carbon-carbon double bond content determined from its iodine value to less than about 0.1 (milliequivalent/g of copolymer). Examples are a hydrogenation product of a copolymer of styrene and butadiene, especially a block copolymer of styrene-butadiene-styrene, and a hydrogenation product of a copolymer of ethylene and isoprene, especially a block copolymer of styrene-isoprene-styrene.

Especially preferred are rubbery copolymers of ethylene and alpha-olefins, above all an ethylene/propylene rubbery copolymer or an ethylene/1-butene rubbery copolymer. Among them, those having an ethylene content of about 40 to about 80 mole % are preferred, and those having an ethylene content of about 50 to about 70 mole % are most suitable. Desirably, these trunk copolymers contain the smallest possible amount of an olefinically unsaturated bond. Accordingly, it should be quite free from a polyene component such as dienes or trienes, or when it contains this component, it is preferred to hydrogenate the copolymer to substantially remove a carbon-carbon double bond prior to use. This is because a copolymer containing an unnegligible amount of an olefinically unsaturated bond tends to be crosslinked under the conditions of grafting the grafting monomer. The crosslinked graft copolymer is difficult to dissolve in lubricating oils and cannot be used as oil-soluble graft copolymers.

However, when a styrene copolymer is used as the trunk copolymer, the carbon-carbon double bond of the aromatic ring does not cause the adverse effects as described above, and only the carbon-carbon double bond of the main chain of the copolymer determined by the iodine value method should be avoided.

As the carboxylic acid component of the saturated esters (a) of unsaturated monocarboxylic acids as the grafting monomer used in the grafting reaction, carboxylic acids having 3 to 11 carbon atoms are preferred. Examples are acrylic acid, methacrylic acid, crotonic acid, vinylacetic acid, allylacetic acid, and omega-undecylenic acid. Methacrylic acid is especially preferred.

As the alcohol component of the ester (a), aliphatic alcohols, alicyclic alcohols, and aromatic alcohols can be cited. Preferably, the alcohol component has 1 to 18 carbon atoms.

Specific examples of the alcohol component include aliphatic alcohols such as methyl alcohol, ethyl alcohol, n-propyl alcohol, iso-propyl alcohol, n-butyl alcohol, iso-butyl alcohol, sec-butyl alcohol, tert-butyl alcohol and linear or branched alkyl alcohols such as pentyl alcohol, hexyl alcohol, heptyl alcohol, octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol and octadecyl alcohol, alicyclic alcohols such as cyclohexyl alcohol, and aromatic alcohols such as benzyl alcohol. Of these, those containing aliphatic alcohols are preferred.

In the grafting reaction, two or more of these saturated esters (a) of unsaturated carboxylic acids may be used simultaneously, or saturated esters (a) of unsaturated carboxylic acids containing two or more alcohol components may be used.

As the carboxylic acid component of the unsaturated ester (b) of saturated carboxylic acids used as the grafting monomer, those having 1 to 18 carbon atoms are preferred. Specific examples of the carboxylic acid component are linear or branched carboxylic acids such as formic acid, acetic acid, propionic acid, butyric acid, valeric acid, caproic acid, enanthoic acid, caprylic acid, pelargonic acid, capric acid, undecylic acid, lauric acid, tridecylic acid, myristic acid, pentadecylic acid, palmitic acid, heptadecylic acid, and stearic acid. Of these, formic acid, acetic acid, butyric acid, caprylic acid, lauric acid and stearic acid are preferred. Acetic acid is especially preferred. Aromatic carboxylic acids such as benzoic acid can also be used.

As the alcohol component of the unsaturated ester (b), those having 2 to 18 carbon atoms are preferred. Specific examples of the alcohol component are vinyl alcohol, allyl alcohol, methallyl alcohol, crotyl alcohol, methylvinyl carbinol, cinnamyl alcohol, undecenyl alcohol, and oleyl alcohol. Of these, vinyl alcohol, allyl alcohol, cinnamyl alcohol, and undecenyl alcohol are preferred. Vinyl alcohol is especially preferred.

In the grafting reaction, two or more of these unsaturated esters (b) of saturated carboxylic acids may be used simultaneously, or an unsaturated ester (b) containing two or more alcohol components may be used.

The unsaturated epoxy compound (c) as a grafting monomer used in the grafting reaction is a compound containing at least one polymerizable unsaturated bond and at least one epoxy group per molecular. Examples of such an unsaturated epoxy compound include unsaturated glycidyl esters of the general formula

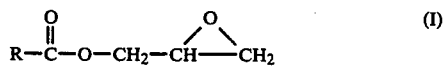

wherein R represents a hydrocarbon group containing a polymerizable ethylenically unsaturated bond, unsaturated glycidyl ethers of the general formula

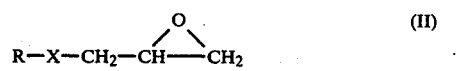

wherein R is the same as in formula (I), and X is a divalent group expressed by the formula

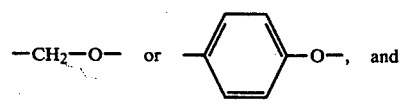

epoxyalkenes of the general formula

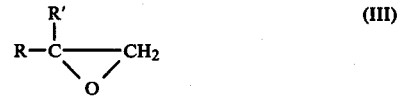

wherein R is the same as in formula (I), and R' is a hydrogen atom or a methyl group.

Specific examples include glycidyl acrylate, glycidyl methacrylate, mono- and di-glycidyl itaconates, mono-, di- and tri-glycidyl butenetricarboxylates, mono- and di-glycidyl citraconates, mono- and di-glycidyl esters of endo-cis-bicyclo(2.2.1)hept-5-ene-2,3-dicarboxylic acid (Nadic Acid, a trademark), mono- and di-glycidyl esters of endo-cis-bicyclo(2.2.1)hept-5-ene-2-methyl-2,3-dicarboxylic acid (Methyl Nadic Acid, a trademark), mono- and di-glycidyl allylsuccinates, glycidyl p-styrenecarboxylate, allyl glycidyl ether, 2-methallyl glycidyl ether, styrene-p-glycidyl ether, p-glycidyl styrene, 3,4-epoxy-1-butene,3,4-epoxy-3-methyl-1-butene, 3,4-epoxy-1-pentene, 3,4-epoxy-3-methyl-1-pentene, 5,6-epoxy-1-hexene, and vinylcyclohexene monoxide.

Of these, the unsaturated glycidyl esters and the unsaturated glycidyl ethers are preferred, and the unsaturated glycidyl ethers are especially preferred. Two or more of these unsaturated epoxy compounds (c) may be used together. Or other vinyl monomers may be used conjointly.

The oil-soluble graft copolymer having grafted thereto at least one of the saturated esters (a) of unsaturated monocarboxylic acids, the unsaturated esters (b) of saturated carboxylic acids and the unsaturated epoxy compounds (c) does not substantially contain a gel and has a melt index at 190° C. of about 0.1 to about 500, preferably about 1 to about 300. The content of the grafting monomer units therein is about $10^{-2}$ to about 5 milliequivalents preferably about $5\times10^{-2}$ to about 1 milliequivalent, per gram of the oil-soluble graft copolymer formed.

In order to inhibit the formation of a homopolymer of the grafting monomer at the time of grafting reaction without causing substantial formation of a gel, it is appropriate to perform the reaction at a reaction temperature of about 110° to about 160° C. in a solvent such as an alkyl aromatic hydrocarbon white feeding the grafting monomer at a rate of $10^{-5}$ to $10^{-2}$ mole/hr per gram of the starting trunk copolymer. It can be achieved by carrying out the grafting reaction by a method in accordance with the technique described in Japanese Patent Publication No. 31276/77. A radical initiator such as an organic peroxide or azonitrile can be used in the grafting reaction.

The organic peroxides include alkyl peroxides, aryl peroxides, acyl peroxides, aroyl peroxides, ketone peroxides, peroxy carbonate, peroxycarboxylates, and hydroperoxides. There can be cited diisopropyl peroxide and tertiary butyl peroxide as the alkyl peroxide; dicumyl peroxide as the aryl peroxide; dilauroyl peroxide as the acyl peroxide; dibenzoyl peroxide as the aroyl peroxide; methyl ethyl ketone peroxide and cyclohexanone peroxide as the ketone peroxides; and tertiary butyl hydroperoxide and cumene hydroperoxide as the hydroperoxide. Examples of the azonitrile are azobisisobutyronitrile and azobisisopropionitrile.

Preferred alkyl aromatic hydrocarbons for use as solvents for the grafting reaction have at least one alkyl group at the aromatic ring, are liquid under the reaction conditions, and can dissolve the starting trunk copolymer, the grafting monomer and the radical initiator. The alkyl group may be linear or branched. Examples of such a solvent include toluene, xylene, trimethylbenzenes, tetramethylbenzenes, ethylbenzene, cumene and cymene. Of these, toluene, xylene, mixed xylene, ethylbenzene, and mixtures of these are preferred. Besides the above-exemplified solvents, there can also be used aliphatic hydrocarbons (hexane, decane, etc.) or halogenated hydrocarbons as the solvent.

According to one mode of practicing the process of this invention, a lubricating oil can be caused to act also as a graft polymerization solvent in the aforesaid graft polymerization. According to this embodiment, there can be provided a process for producing a lubricating oil composition, which comprises graft-copolymerizing a grafting monomer selected from the group consisting of (a) saturated esters of unsaturated monocarboxylic acids, (b) unsaturated esters of saturated carboxylic acids, and (c) unsaturated epoxy compounds with a trunk copolymer selected from the group consisting of copolymers of alpha-olefins having 2 to 20 carbon atoms, copolymers of styrene and alpha-olefins having 2 to 20 carbon atoms and hydrogenation products of copolymers of styrene and diolefins, said trunk copolymer having (i) a number average molecular weight of about 5,000 to about 100,000, (ii) a carbon-carbon double bond content determined from its iodine value of not more than about 0.1 (milliequivalent/g of copolymer), and (iii) an oxygen content of not more than about 0.3% by weight, in a lubricating oil to form therein an oil-soluble graft copolymer having the grafting monomer grafted thereto in an amount of about $10^{-2}$ to about 5 milliequivalents per gram of the graft copolymer, the composition containing about 0.5 to about 40% by weight of the graft copolymer based on the weight of the lubricating oil.

According to this embodiment, there can be provided a composition set forth in claim 1 in which the lubricating oil is partly or wholly modified with a modifying monomer selected from the group consisting of (a) saturated esters of unsaturated monocarboxylic acids, (b) unsaturated esters of saturated carboxylic acids, and (c) unsaturated epoxy compounds. Examples of the modifying monomer are the compounds (a), (b) and (c) described hereinabove as the grafting monomer.

As a radical initiator used at the time of polymerizing the trunk copolymer and the grafting monomer in the presence of the lubricating oil, those already exemplified hereinabove can be used. Preferably, there are used initiators whose decomposition products have a boiling point lower than or equal to that of the modifying monomer used, such as ditertiary butylperoxide, tertiary butylperoxyisobutyrate, and tertiary butylperoxyoctoate.

This is because by subjecting the reaction mixture to an ordinary deaerating treatment after the reaction, the decomposition product of the radical initiator can be removed at the same time as the unreacted modifying monomer. This method is especially suitable because it permits the omission of a step of isolating the oil-soluble graft copolymer from the reaction mixture, and the reaction mixture can be used directly as a lubricating oil composition or a lubricating oil additive.

Furthermore, according to this embodiment, the lubricating oil as well as the trunk copolymer reacts with the modifying monomer. Such a modified product imparts more favorable properties to the lubricating oil composition.

The grafting reaction between the trunk copolymer and the grafting monomer or the modifying monomer in this invention including the aforesaid embodiment is preferably carried out at a temperature of about 80° to about 250° C., especially about 100° to about 200° C. When the reaction temperature is lower than the above-specified limit, it is impossible to inhibit fully the formation of a homopolymer of the grafting monomer or the modifying monomer, and crosslinking of the trunk copolymer is prone to take place. Consequently, it is difficult to obtain a product suitable as a lubricating oil composition or an additive therefor. On the other hand, when the reaction temperature is higher than the above-specified limit, the grafting reaction tends to be difficult. Accordingly, the use of the above-exemplified temperatures is preferred.

The grafting reaction is carried out under such conditions that about 10 to about 300 parts by weight of the trunk copolymer and about 0.2 to about 20 parts by weight of the radical initiator are used per 1000 parts by volume of the reaction solvent. It is preferred to choose a reaction procedure which does not give a homopolymer of the grafting monomer or modifying monomer.

Preferably, the grafting reaction is carried out, for example, by dissolving the trunk copolymer in the reaction solvent, and feeding the grafting monomer or modifying monomer and the radical initiator into the reaction system at the above reaction temperature. Or it can be performed by dissolving the trunk copolymer and the grafting monomer or modifying monomer in the reaction solvent, and feeding the radical initiator into the solution at the aforesaid reaction temperature. A procedure can also be employed in which the trunk copolymer, the grafting or modifying monomer and the radical initiator are dissolved uniformly in the solvent, and then they are reacted at the aforesaid temperature.

When a lube oil is used as the reaction solvent, the resulting reaction mixture after the reaction can be used as a lube oil composition either directly, or if desired, after subjecting the reaction mixture to a deaerating treatment, and further if desired, after diluting it with the same or different lube oil to adjust the content of the oil-soluble graft copolymer. In the embodiment in which the lube oil is used as the reaction solvent, about 10 to 90% of the total amount of the modifying monomer fed reacts with the lube oil.

When other reaction solvents are used, it is possible to isolate the resulting oil-soluble graft copolymer and then re-dissolve it in a lube oil for end use.

The concentration of the oil-soluble graft copolymer in the lube oil composition is usually about 0.5 to about 40% by weight.

Previously suggested viscosity index improvers composed of an ethylene-propylene rubbery copolymer or other olefinic copolymers are frequently used as a mixture with other viscosity index improvers such as poly-(alkyl methacrylates). When a lube oil is added in a high concentration in such a case, the resulting composition is prone to separate into two layers because of the low compatibility with the two kinds of viscosity index improvers.

On the other hand, the oil-soluble graft copolymer in accordance with the process of this invention, especially an ethylene-propylene rubbery copolymer modified with an alkyl ester of an unsaturated carboxylic acid, has superior compatibility with other viscosity index improvers.

The lube oil composition of this invention has a high viscosity index and superior oxidation stability and detergency and dispersing property. It may contain other lube oil additives. For example, other viscosity index improvers, detergency and dispersing agents, extreme pressure additives, pour point depressants, anti-foamers, antioxidants, etc. may be incorporated.

BEST MODE OF PRACTICING THE INVENTION

The invention is described in more detail by the following examples. The tests in these examples were performed as follows:

(1) Dynamic viscosity

Measured in accordance with JIS K-2283 using a Cannon-Fenske viscosity tube at a temperature of 100° F. (37.8° C.) or 210° F. (98.9° C.).

(2) Viscosity index

The viscosity index was measured in accordance with JIS K-2284.

(3) Shear stability

Measured substantially in accordance with ASTM D-2603-70. Specifically, a sample oil was subjected to the irradiation of ultrasonic waves (100 W, 10 KHz) for 30 minutes. The dynamic viscosities at 210° F. (designated $\eta_1$ and $\eta_2$, respectively) before and after the irradiation were measured. The shear stability was calculated in accordance with the following equation.

Shear stability (viscosity decrease rate)

$$\frac{\eta_1 - \eta_2}{\eta_1} \times 100 \, (\%)$$

(4) CCS low temperature viscosity

The low temperature viscosity of 0° F. was measured in accordance with JIS K-2606 using a low temperature viscometer made by Canon Company.

(5) Oxidation stability

The dynamic viscosity at 100° F. was measured in accordance with JIS K-2514-1972 at a temperature of 165.5° C. using an Indiana stirring oxidation stability tester at 24 hours as stipulated in JIS and also at 6, 48, 72, and 96 hours. The ratio between the viscosities before and after the test was calculated.

Moreover, at 48 and 96 hours, the varnish stick was taken out, and the degree of adherent lacquer was observed.

(6) Detergency and dispersing property

The test was performed using a panel coking tester produced in accordance with the standards of Fed. Test Method STD. No. 791B (Coking Tendency of Oil). At an Al panel temperature of 285° C. and a sample temperature of 125° C., a cycle consisting of one second rotation of a splasher and 9 second stopping of the splasher was repeated, and after a lapse of 5 hours, the weight (mg) of the carbon sludge deposited on the surface of the test piece was measured.

(7) Degree of the clarity of an oil solution

Measured substantially in accordance with the method of measuring the turbidity of water in JIS K-0101. Standard turbid solutions having a kaolin concentration of 5, 10, 15, 20, 30, 40, 50, 100, 200, 400, and 500 ppm were prepared using purified kaolin and distilled water. The sample oil solution was compared with each of the standard solutions by the naked eye. According to this method, the solution was completely clear or nearly clear when it corresponded to a kaolin content of up to 20 ppm. It was slightly turbid when it corresponded to a kaolin content of 30 to 50 ppm, and was considerably turbid when it corresponded to a kaolin content of more than 100 ppm. The error of evaluation after the repetition of the test was ±5 ppm.

EXAMPLE 1

Two hundred (200) grams of an ethylene-propylene rubbery copolymer [ethylene content 60 mole %; reduced specific viscosity (RSV) in decalin at 135° C. 1.0; melt index at 190° C. (load 2160 g, orifice diameter 2 mm) 30 g/10 minutes; number average molecular weight 18,000; $M_w/M_n$ by GPC 1.9; the content of a carbon-carbon double bond by an iodine method 0.03 milliequivalent/g of copolymer; oxygen content not more than 0.3% by weight; no endothermic peak by DSC; degree of crystallization by X-ray 0%] was added to 800 g of commercially available No. 100 neutral oil [dynamic viscosities at 100° F. and 210° F. 22.5 and 4.27 cst, respectively; viscosity index 104; pour point −17.5° C.]. The liquid was purged with nitrogen gas for 1 hour. The temperature of the liquid was raised to 150° C. to dissolve the copolymer completely.

At a temperature of 150° C., the modifying monomer and di-tertiary butyl peroxide as a catalyst described in Table 1 were added dropwise to 1 liter of the copolymer-neutral oil solution over the course of 4 hours.

As an after reaction, the mixture was stirred for 2 hours. Subsequently, the temperature of the reaction mixture was raised to 180° C., and nitrogen gas was blown into the reaction mixture for 2 hours to remove volatile components such as the decomposition product of the peroxide catalyst and the unreacted modifying monomer in the reaction mixture.

The resulting modified solution was clear. A sample oil having a viscosity of 17 cst at 210° F. was prepared by adding the resulting modified solution to a commercially available No. 150 neutral oil (dynamic viscosities at 100° F. and 210° F. 33.1 and 5.36 cst, respectively; viscosity index 105; pour point −17.5° C.). The sample oil was subjected to various tests, and the results are shown in Table 2.

TABLE 1

| | Preparation of a graft copolymer | | |
|---|---|---|---|
| | Per liter of the copolymer-neutral oil solution | | Degree of clarity of |
| Modified solution | Type and amount (g) of the modifying monomer | Amount (g) of ditertiary butyl peroxide | the modified solution |
| A | n-Butyl methacrylate (71.2) | (18.3) | Kaolin 20 ppm |
| B | Vinyl acetate (17.2) | (7.3) | Kaolin 15 ppm |
| C | Allyl glycidyl | | Kaolin |

TABLE 1-continued

| | Preparation of a graft copolymer | | |
|---|---|---|---|
| | Per liter of the copolymer-neutral oil solution | | Degree of clarity of the modified solution |
| Modified solution | Type and amount (g) of the modifying monomer | Amount (g) of ditertiary butyl peroxide | |
| | ether (57.2) | (18.3) | 20 ppm |

COMPARATIVE EXAMPLE 1

Two hundred (200) grams of the same unmodified ethylene-propylene rubbery copolymer as used in Example 1 was added to 800 g of the same No. 100 neutral oil as used in Example 1, and in the same way as in Example 1, a neutral oil solution D containing 20% by weight of the copolymer was prepared. The degree of the clarity of this solution corresponded to a standard turbid solution containing 15 ppm of kaolin. The resulting solution was added to the same No. 150 neutral oil as used in Example 1 to prepare a sample oil having a dynamic viscosity of 17 cst at 210° F. The results of tests are shown in Table 2.

TABLE 2

| Modified solution | Amount of the modified solution added to neutral oil (wt. %) | Viscosity index | CCS low temperature viscosity (cps) | Shear stability (viscosity decrease rate, %) | Amount of the sludge deposited in panel coking test (mg) |
|---|---|---|---|---|---|
| A | 12.5 | 161 | 2000 | 8.7 | 88 |
| B | 13.4 | 160 | 2000 | 9.1 | 102 |
| C | 13.3 | 160 | 2030 | 8.0 | 115 |
| D (Comparison) | 12.7 | 161 | 2230 | 8.0 | 460 |

| Modified solution | Indiana oxidation test (viscosity ratio) | | | | | | Indiana oxidation test (the degree of adherent lacquer) | |
|---|---|---|---|---|---|---|---|---|
| | 6 hr | 12 hr | 24 hr | 48 hr | 72 hr | 96 hr | 48 hr | 96 hr |
| A | 0.75 | 0.70 | 0.65 | 0.69 | 0.80 | 1.10 | No deposit | No deposit |
| B | 0.73 | 0.68 | 0.70 | 0.93 | 0.99 | 1.05 | No deposit | No deposit |
| C | 0.70 | 0.68 | 0.65 | 0.76 | 0.95 | 1.05 | No deposit | No deposit |
| D (comparison) | 0.75 | 0.70 | 0.66 | 0.71 | 0.76 | 0.85 | A thick deposit formed. | A thick deposit formed. |

EXAMPLE 2

Acetone and hexane were added to each of the modified solutions A, B and C obtained in Example 1 to precipitate the graft copolymers. The resulting graft copolymers were each washed repeatedly with acetone to afford purified graft copolymers A', B' and C'.

The modified solutions and the trapped liquids of the volatilized components were analyzed to determine the percentage of that portion of the grafting monomer which was grafted to the trunk copolymer and the percentage of that portion of the grafting monomer which reacted with the neutral oil. The results are shown in Table 3.

Each of the purified graft copolymers was dissolved in No. 100 neutral oil to obtain a clear neutral oil solution containing 20% by weight of the copolymer. The solution was further added to the same No. 150 neutral oil as used in Example 1 to prepare a sample oil having a dynamic viscosity at 210° F. of 17 cst.

The sample oil was subjected to various tests, and the results are shown in Table 4.

TABLE 3

| Graft copolymer | A' | B' | C' |
|---|---|---|---|
| Analytical values of the purified graft copolymer | | | |
| Type of the grafting monomer | n-Butyl methacrylate | Vinyl acetate | Allyl glycidyl ether |
| Amount of the grafting monomer | | | |
| (wt. %) | 3.9 | 1.5 | 3.6 |
| (milliequivalents/g-copolymer) | 0.27 | 0.18 | 0.315 |
| RSV | 1.08 | 0.80 | 1.18 |
| Amount (%) of the monomer grafted to the trunk copolymer | 13 | 18 | 13 |
| Amount (%) of the monomer reacted with the neutral oil | 85 | 42.5 | 62 |
| Unreacted grafting monomer Trapped as a volatilized component (%) | 2 | 39 | 25 |
| Remaining in the modified solution after deaeration treatment (%) | 0 | 0.5 | 0 |

TABLE 4

| Graft copolymer | Amount of the graft copolymer added to neutral oil (wt. %) | Viscosity index | CCS low temperature viscosity (CPS) | Shear stability (viscosity decrease rate %) | Amount of the sludge deposited in the panel coking test (mg) |
|---|---|---|---|---|---|
| A' | 12.3 | 161 | 1900 | 8.2 | 84 |
| B' | 13.3 | 161 | 1950 | 8.7 | 105 |
| C' | 13.3 | 160 | 1950 | 8.4 | 138 |
| D (comparison) | 12.7 | 161 | 2230 | 8.0 | 460 |

REFERENTIAL EXAMPLE 1

A sample oil having a dynamic viscosity of 17 cst at 210° F. was prepared by adding 12.4% by weight of a commercially available polymethacrylate-type viscosity index improver to the same No. 150 neutral oil as used in Example 2. The results of tests are shown in Table 5.

COMPARATIVE EXAMPLE 2

The same solution of unmodified ethylene-propylene rubbery copolymer in No. 100 neutral oil (copolymer 20% by weight) as used in Comparative Example 1 was mixed with the polymethacrylate-type viscosity improver used in Referential Example 1 in a ratio of 4:1. The mixture was added in an amount of 12.5% by weight to the same No. 150 neutral oil as used in Example 2 to prepare a sample oil. The results of tests are shown in Table 5.

TABLE 5

| Run No. | Viscosity index | Shear stability (viscosity decrease rate, %) | Amount of the sludge deposited in the panel coking test (mg) |
|---|---|---|---|
| Referential Example 1 | 240 | 32.0 | 404 |
| Comparative Example 2 | 172 | 12.6 | 311 |

It is seen from the results given in Tables 2, 4 and 5 that the graft copolymers in accordance with the process of this invention have markedly improved detergency and dispersing property while retaining their good viscosity increasing ability and shear before modification. It is also clear from these experimental facts that these results are obtained only when the methacrylate ester is grafted to the copolymer in accordance with the method of this invention, and can never be achieved when a commercially available polymethacrylate-type viscosity index improver having no detergency and dispersing ability is merely blended therewith.

EXAMPLE 3

Two hundred (200) grams of the same ethylene-propylene rubbery copolymer as used in Example 1 was added to a solvent, and the system was purged with nitrogen for one hour. The temperature of the mixture was then raised to 125° C. to dissolve the copolymer completely. From separate feed openings, the grafting monomer and the radical initiator described in Table 6 were added dropwise over the course of 4 hours. After the addition, the mixture was kept stirred for 2 hours to perform an after-reaction. After the reaction, the reaction mixture was cooled to room temperature, and a large amount of acetone was added to precipitate the resulting graft copolymer. The resulting precipitate was fully washed with acetone, vacuum-dried at room temperature, purified, and dried to form a graft copolymer. The amount of the grafting monomer units introduced into the graft copolymer was calculated from its oxygen content.

The resulting graft copolymer was added to the same No. 100 neutral oil used in Example 1 to form a 20% by weight neutral oil solution of the graft copolymer.

The clarity of the solution was good in all runs.

A sample oil having a dynamic viscosity of 17 cst at 210° F. was prepared by adding the graft copolymer solution to the same No. 150 neutral oil as used in Example 1. The results of tests are shown in Table 7.

TABLE 6

Preparation of graft copolymers

| Graft copolymer | Type and amount (g) of the grafting monomer | Type and amount (g) of the radical initiator | Type and amount of the reaction solvent | Reaction temperature (°C.) | Amount of the grafting monomer grafted to the copolymer (wt, %) |
|---|---|---|---|---|---|
| E | Butyl methacrylate (71) | Dicumyl peroxide* (1.35) | Xylene (1 liter) | 125 | 3.2 |
| F | Vinyl acetate (17.2) | Dicumyl peroxide* (1.35) | Xylene (1 liter) | 125 | 1.2 |
| G | Glycidyl methacrylate (71) | Dicumyl peroxide* (1.35) | Xylene (1 liter) | 125 | 3.6 |
| H | Allyl glycidyl ether (52) | Di-tert.butyl peroxide* (8.3) | n-Decane (800 g) | 150 | 4.0 |
| I | n-Butyl methacrylate (71) | Azobisisobutyronitrile (8.2)** | Xylene (1 liter) | 125 | 1.3 |

| Graft copolymer | Clarity of the solution of the graft copolymer and the No. 100 neutral oil | Sample oil | | |
|---|---|---|---|---|
| | | Viscosity index | CCS low temperature viscosity (CPS) | Amount of the sludge deposited panel coking test (mg) |
| E | Kaolin 20 ppm | 160 | 1870 | 90 |
| F | 20 ppm | 160 | 1900 | 105 |
| G | 20 ppm | 160 | 2080 | 152 |
| H | 10 ppm | 161 | 2000 | 120 |
| I | 20 ppm | 160 | 2100 | 132 |

*Used as a 20 ml xylene solution
**Used as a 50 ml ethanol solution.

EXAMPLE 4

Clear modified neutral oil solutions were obtained by the same procedure as in Example 1 except that the compounds described in Table 8 were used as modifying monomers. Sample oils were prepared by adding the modified solutions to No. 150 neutral oil. The results of testing of the sample oils are shown in Table 8.

TABLE 8

| Type of the modifying monomer | Amount of the modified solution added to the neutral oil (wt. %) | Viscosity index | CCS low temperature viscosity (CPS) | Amount of the sludge deposited in the panel coking test (mg) |
|---|---|---|---|---|
| Methyl methacrylate | 12.0 | 161 | 2030 | 104 |
| 2-Ethylhexyl methacrylate | 13.1 | 161 | 2160 | 120 |
| Lauryl methacrylate | 13.4 | 161 | 2130 | 93 |
| Stearyl methacrylate | 13.7 | 161 | 2000 | 127 |
| Methyl undecylate | 12.8 | 160 | 2150 | 118 |
| Mixture of lauryl | | | | |

TABLE 8-continued

| Type of the modifying monomer | Amount of the modified solution added to the neutral oil (wt. %) | Viscosity index | CCS low temperature viscosity (CPS) | Amount of the sludge deposited in the panel coking test (mg) |
|---|---|---|---|---|
| methacrylate and tridecyl methacrylate (45:55 by weight) | 13.4 | 165 | 2200 | 100 |
| Vinyl butyrate | 13.6 | 160 | 2130 | 110 |
| Vinyl laurate | 12.7 | 159 | 2030 | 120 |
| Vinyl stearate | 13.3 | 158 | 2070 | 133 |
| Allyl acetate | 13.0 | 161 | 2100 | 102 |
| Glycidyl acrylate | 12.6 | 162 | 2180 | 122 |
| 3,4-Epoxy-3-methyl-1-butene | 13.0 | 160 | 2090 | 143 |

EXAMPLE 5

A part of the modified solution used in the sample oil prepared in Example 1 was replaced by the No. 150 neutral oil solution of unmodified ethylene propylene rubbery copolymer of Comparative Example 1 so that the proportions shown in Table 9 were attained. Thus, there were obtained sample oils resulting from the dilution of the modified copolymer solution in the sample oil by the unmodified copolymer solution. The results are shown in Table 9.

TABLE 9

| | Proportions in the sample oil (wt. %) Modified solution/ unmodified solution | Viscosity index | Amount of the sludge deposited in the panel coking test (mg) |
|---|---|---|---|
| n-Butyl methacrylate-modified solution (amount added 12.5 wt. %) | 2/10.5 | 161 | 97 |
| | 4/8.5 | 160 | 110 |
| | 9/3.5 | 160 | 103 |
| | 12.5/0 | 161 | 88 |
| Vinyl acetate-modified solution (amount added 13.4 wt. %) | 2/11.4 | 161 | 128 |
| | 4/9.4 | 160 | 108 |
| | 9/4.4 | 160 | 115 |
| | 13.4/0 | 160 | 102 |
| Allyl glycidyl ether-modified solution | 2/11.3 | 160 | 125 |
| | 4/9.3 | 161 | 113 |
| | 9/4.3 | 161 | 130 |
| (amount added 13.3 wt. %) | 13.3/0 | 160 | 115 |

EXAMPLE 6

Modified solutions containing an ethylene-propylene copolymer with different amounts of grafting monomers were obtained in the same way as in Example 1 except that the amounts of the modifying monomers and di-tertiary butyl peroxide described in Table 10 were changed. The modified solutions were each dissolved in No. 150 neutral oils in the same way as in Example 1 to prepare sample oils having a viscosity of 17 cst at 210° F. The results are shown in Table 10.

TABLE 10

| Modifying monomer | Content of the modifying monomer (milliequivalents/g) in the purified graft copolymer | Clarity of the sample oil | Amount of the sludge deposited in the panel coking test (mg) |
|---|---|---|---|
| n-Butyl methacrylate | 0.008 | Kaolin 10 ppm | 280 |
| | 0.95 | Kaolin 20 ppm | 80 |
| | 2.6 | Kaolin 25 ppm | 87 |
| | 5.2 | Kaolin 100 ppm | 86 |
| Vinyl acetate | 0.01 | Kaolin 10 ppm | 280 |
| | 0.09 | Kaolin 15 ppm | 80 |
| | 1.8 | Kaolin 25 ppm | 87 |
| | 4.1 | Kaolin 100 ppm | 86 |
| Allyl glycidyl ether | 0.009 | Kaolin 10 ppm | 240 |
| | 0.81 | Kaolin 20 ppm | 103 |
| | 2.1 | Kaolin 25 ppm | 115 |
| | 5.3 | Kaolin 100 ppm | 110 |

EXAMPLE 7

Modified solutions were obtained in the same way as in Example 1 except that the trunk copolymers shown in Table 11 were used. The modified solutions were each added to No. 150 neutral oil to prepare sample oils having a viscosity of 17 cst at 210° F. The results are shown in Table 11.

TABLE 11

| Trunk copolymer | | | | | | | | |
|---|---|---|---|---|---|---|---|---|
| | Number average molecular weight | C=C bond content (meq./g) | Oxygen content (wt. %) | Modifying monomer | Clarity of the modified oil | Viscosity index | Shear stability (viscosity decrease rate, %) | Amount of the sludge deposited in the panel coking test of the sample oil (mg) |
| Ethylene propylene copolymer (ethylene content 46 mole %) | 15,000 | 0.05 | below 0.3 | n-Butyl methacrylate | Kaolin 15 ppm | 163 | 11.3 | 96 |
| | | | | vinyl acetate | 15 ppm | 160 | 9.9 | 107 |
| | | | | Allyl glycidyl ether | 15 ppm | 161 | 13.0 | 125 |
| Ethylene-propylene copolymer (ethylene content 70 mole %) | 18,000 | 0.04 | below 0.3 | n-Butyl methacrylate | Kaolin 15 ppm | 170 | 12.0 | 104 |
| | | | | Vinyl acetate | 15 ppm | 168 | 10.5 | 105 |
| | | | | Allyl glycidyl ether | 15 ppm | 168 | 10.2 | 109 |
| Ethylene-propylene copolymer (ethylene | 5,400 | 0.07 | below 0.3 | n-Butyl methacrylate | Kaolin 15 ppm | 130 | 4.0 | 135 |
| | | | | Vinyl acetate | 15 ppm | 128 | 4.2 | 140 |
| | | | | Allyl glycidyl | | | | |

TABLE 11-continued

| Trunk copolymer | | | | | | | | |
|---|---|---|---|---|---|---|---|---|
| | Number average molecular weight | C=C bond content (meq./g) | Oxygen content (wt. %) | Modifying monomer | Clarity of the modified oil | Viscosity index | Shear stability (viscosity decrease rate, %) | Amount of the sludge deposited in the panel coking test of the sample oil (mg) |
| content 56 mole %) | | | | ether | 15 ppm | 129 | 3.9 | 131 |
| Ethylene-propylene copolymer (ethylene content 60 mole %) | 9,800 | 0.03 | below 0.3 | n-Butyl methacrylate Vinyl acetate Allyl glycidyl ether | Kaolin 15 ppm 15 ppm 15 ppm | 155 158 157 | 6.5 6.6 6.0 | 103 112 99 |
| Ethylene-propylene copolymer (ethylene content 58 mole %) | 60,300 | 0.03 | below 0.3 | n-Butyl methacrylate Vinyl acetate Allyl glycidyl ether | Kaolin 15 ppm 15 ppm 15 ppm | 162 161 162 | 15.2 16.3 14.9 | 70 82 68 |
| Ethylene-propylene copolymer (ethylene content 60 mole %) | 99,000 | 0.03 | below 0.3 | n-Butyl methacrylate Vinyl acetate Allyl glycidyl ether | Kaolin 15 ppm 15 ppm 15 ppm | 160 160 161 | 18.8 19.0 18.1 | 63 59 62 |
| Ethylene-1-butene copolymer (ethylene content 60 mole %) | 16,000 | 0.03 | below 0.3 | n-Butyl methacrylate Vinyl acetate Allyl glycidyl ether | Kaolin 20 ppm 15 ppm 15 ppm | 162 163 162 | 8.2 7.8 8.8 | 135 128 121 |
| Ethylene-1-eicosene copolymer (ethylene content 58 mole %) | 17,000 | 0.03 | below 0.3 | n-Butyl methacrylate Vinyl acetate Allyl glycidyl ether | Kaolin 15 ppm 20 ppm 15 ppm | 166 166 164 | 9.7 10.1 8.9 | 129 120 131 |
| Propylene-1-butene copolymer (propylene content 63 mole %) | 45,000 | 0.04 | below 0.3 | n-Butyl methacrylate Vinyl acetate Allyl glycidyl ether | Kaolin 20 ppm 15 ppm 20 ppm | 171 169 168 | 12.3 10.5 11.9 | 130 122 125 |
| Ethylene-propylene-1-butene copolymer (ethylene content 60 mole %, propylene content 30 mole %) | 16,000 | 0.03 | below 0.3 | n-Butyl methacrylate Vinyl acetate Allyl glycidyl ether | Kaolin 15 ppm 15 ppm 15 ppm | 160 161 160 | 7.8 7.5 8.6 | 116 123 120 |

EXAMPLE 8

A solution of a modified ethylene-propylene copolymer in No. 100 neutral oil was prepared in the same way as in Example 1 except that the methods of adding the modifying monomer and di-tertiary butyl peroxide were changed as shown in Table 12.

The resulting solution was added to a commercially available No. 150 neutral oil by the same method as in Example 1 to prepare a sample oil having a viscosity of 17 cst at 210° F. The results of the tests are shown in Table 12.

TABLE 12

| Modifying monomer | Method of supplying the modifying monomer | Method of supplying DTBPO | Content of the modified monomer in EPR (milliequivalents/g) | Amount of the sludge deposited in the panel coking test (mg) |
|---|---|---|---|---|
| n-Butyl methacrylate | At a time At a time Dropwise over 4 hours | At a time Dropwise over 4 hours At a time | 0.45 0.44 0.30 (gelled) | 96 106 321 |
| Vinyl acetate | At a time At a time Dropwise | At a time Dropwise over 4 hours | 0.28 0.25 | 112 108 |

TABLE 12-continued

| Modifying monomer | Method of supplying the modifying monomer | Method of supplying DTBPO | Content of the modified monomer in EPR (milliequivalents/g) | Amount of the sludge deposited in the panel coking test (mg) |
|---|---|---|---|---|
| | over 4 hours | At a time | 0.20 (gelled) | 290 |
| Allyl glycidyl ether | At a time | At a time | 0.42 | 108 |
| | At a time | Dropwise over 4 hours | 0.41 | 120 |
| | Dropwise over 4 hours | At a time | 0.30 (gelled) | 360 |

(Note)
DTBPO: ditertiary butyl peroxide
EPR: ethylene-propylene rubbery copolymer At a time: The ethylene-propylene rubbery copolymer was dissolved in No. 100 neutral oil heated to 150° C. Then, a solution of modifying monomer or peroxide was added to the hot solution at a time.

Dropwise over 4 hours: The ethylene-propylene rubbery copolymer was dissolved in No. 100 neutral oil, and heated to 150° C. A solution of modifying monomer or peroxide was then added to the hot solution dropwisely over the course of 4 hours.

EXAMPLE 9

A purified graft copolymer was obtained by the same method as in Example 3 except that the reaction temperature was changed to 100° C., and 100 g of the same ethylene-propylene copolymer as used in Example 1, 1 liter of toluene as a solvent and each of the radical initiators and the grafting monomers shown in Table 13 were used.

The purified graft copolymer was dissolved in No. 100 neutral oil to form a 20% by weight neutral oil solution. Then, the neutral oil solution was added to No. 150 neutral oil, to prepare a sample oil having a viscosity of 17 cst at 210° F.

The sample oils were tested, and the results are shown in Table 13.

TABLE 13

| Grafting monomer | | | |
|---|---|---|---|
| Type | n-Butyl methacrylate | Vinyl acetate | Glycidyl methacrylate |
| Amount (g) | 7.2 | 17.2 | 56.4 |
| Radical initiators | | | |
| Type | Benzoyl peroxide | Benzoyl peroxide | Dicumyl peroxide |
| Amount (g) | 6.05 (*) | 6.05 (*) | 0.54 (**) |
| Content of the graft monomer in the graft copolymer | | | |
| Weight percent | 9.3 | 1.9 | 1.35 |
| Milliequivalents/g of copolymer | 0.65 | 0.22 | 0.095 |
| Sample oil | | | |
| Viscosity index | 163 | 163 | 162 |
| Amount of the sludge deposited after the panel coking test (mg) | 95 | 95 | 110 |
| Rate of viscosity decrease after ultrasonic irradiation (%) | 8.0 | 8.0 | 10.2 |

(*): Used as a solution in 60 ml of acetone.
(**): Used as a solution in 20 ml of toluene.

COMPARATIVE EXAMPLE 3

As an ethylene-propylene rubbery copolymer, 250 g of amorphous rubber having an ethylene content of 60 mole % and a reduced specific viscosity (RSV) at 135° C. in decalin of 4.5 was dissolved in 5 liters of o-dichlorobenzene. With stirring at 180° C., air was blown into the solution at a rate of 120 liters/hour for 6 hours. The reaction mixture was then cooled to room temperature, and a large amount of acetone was added to afford an ethylene-propylene rubbery copolymer oxidatively degraded by air. The infrared absorption spectral analysis of the degraded copolymer showed the presence of a carbon-carbon double bond by the cleavage of the main polymer chain in addition to the presence of oxygen-containing functional groups such as hydroxyl, formyl, ketone, and carboxylate. The content of the double, determined from the iodine value of the degraded polymer, was about 0.15 milliequivalent/g of copolymer, and the oxygen content was 0.6% by weight. The degraded copolymer had an RSV of 0.72.

The same modifying reaction as in Example 1 was carried out except that a solution of the resulting degraded ethylene-propylene rubbery copolymer in a neutral oil was used.

In any of the runs, the viscosity of the reaction solution increased markedly. The reaction solution was added to the same No. 150 neutral oil as used in Example 1 to prepare a sample oil having a viscosity of 17 cst at 210° F. The sample oils were tested, and the results are shown in Table 14.

TABLE 14

| Modifying monomer | | Amount added to neutral oil (%) | Viscosity | CCS low temperature viscosity (cps) | Shear stability, viscosity decrease rate (%) | Amount of the sludge deposited in the panel coking test (mg) | Indiana oxidation test, degree of adherent lacquer | |
|---|---|---|---|---|---|---|---|---|
| Type | Content (wt. %) | | | | | | 48 hrs | 96 hrs |
| n-Butyl methacrylate | 4.2 | 10.8 | 155 | 2000 | 25 | 280 | Some deposit | Heavy deposit |
| Vinyl acetate | 1.6 | 11.6 | 158 | 2060 | 21 | 305 | Some deposit | Heavy deposit |
| Allyl glycidyl | | | | | | | Some deposit | Heavy deposit |

TABLE 14-continued

| Modifying monomer | | Amount added to neutral oil (%) | Viscosity | CCS low temperature viscosity (cps) | Shear stability, viscosity decrease rate (%) | Amount of the sludge deposited in the panel coking test (mg) | Indiana oxidation test, degree of adherent lacquer | |
|---|---|---|---|---|---|---|---|---|
| Type | Content (wt. %) | | | | | | 48 hrs | 96 hrs |
| ether | 3.8 | 11.6 | 157 | 2080 | 24 | 312 | | |

EXAMPLE 10

A modified solution was obtained in the same way as in Example 1 except that as a starting trunk copolymer, a hydrogenated product of a styrene-isoprene-styrene copolymer (styrene content 15 mole %; molecular weight 90,000; carbon-carbon double bond content determined by iodine value 0.07 milliequivalent/g of copolymer; oxygen content less than 0.3%) was used. The solution was added to No. 150 neutral oil to prepare a sample oil having a viscosity of 17 cst at 210° F. The results are shown in Table 15.

COMPARATIVE EXAMPLE 4

As a starting trunk copolymer, the same hydrogenated copolymer as used in Example 10 was used without modification. In the same way as in Example 10, a solution of the copolymer in No. 100 neutral oil was prepared and then added to No. 150 neutral oil to prepare a sample oil having a viscosity of 17 cst at 210° C. The results are shown in Table 15.

TABLE 15

| Modifying monomer | Amount of the modified solution added to No. 150 neutral oil (wt. %) | Viscosity index | CCS low temperature viscosity (cps) | Shear stability, viscosity decrease rate (%) | Amount of the sludge deposited in the panel coking test (mg) | Clarity of the sample oil |
|---|---|---|---|---|---|---|
| n-Butyl methacrylate | 24.6 | 165 | 1570 | 14.5 | 115 | Kaolin 20 ppm |
| Vinyl acetate | 24.8 | 169 | 1490 | 14.0 | 106 | 20 ppm |
| Allyl glycidyl ether | 25.2 | 168 | 1500 | 14.2 | 123 | 20 ppm |
| Unmodified (Comparative Example) | 25.0 | 168 | 1510 | 13.3 | 325 | 20 ppm |

We claim:

1. A process for preparing a lubricating oil composition containing about 0.5 to about 40% by weight, based on the weight of the lubricating oil, of an oil-soluble graft copolymer, which comprises graft-copolymerizing in the presence of a radical initiator added thereto, a grafting monomer selected from the group consisting of
   (a) saturated esters of unsaturated monocarboxylic acids,
   (b) unsaturated esters of saturated carboxylic acids, and
   (c) unsaturated epoxy compounds
with a lubricating oil and trunk copolymer selected from the group consisting of copolymers of alpha-olefins having 2 to 20 carbon atoms, and hydrogenated products of copolymers of styrene and diolefins and/or alpha-olefins having 2 to 20 carbon atoms, said trunk copolymer having
   (i) a number average molecular weight of about 5,000 to about 100,000,
   (ii) a carbon-carbon double bond content determined from its iodine value of not more than about 0.1, and
   (iii) an oxygen content of not more than about 0.3% by weight,
thereby to form said oil-soluble graft copolymer having grafted thereto about $10^{-2}$ to about 5 milliequivalents, per gram of the graft copolymer, of said grafting monomer.

2. The process set forth in claim 1 wherein said graft copolymerization is carried out at a temperature of about 80° C. to about 250° C.

3. The process set forth in claim 1 wherein said alpha-olefin copolymer is a rubbery copolymer of ethylene.

4. The process set forth in claim 3 wherein said rubbery copolymer of ethylene is an ethylene-propylene rubbery copolymer.

5. The process set forth in any one of claims 1 to 4 wherein said alpha-olefin copolymer has a melt index at 190° C. of about 0.1 to about 500.

6. The process set forth in claim 3 or 4 wherein said rubbery copolymer of ethylene has an ethylene content of about 40 to about 80 mole %.

7. The process set forth in claim 1 wherein said hydrogenated copolymer is a hydrogenation product of a copolymer of the styrene-diolefin-styrene type.

8. The process set forth in claim 7 wherein the diolefin of said hydrogenation product of a copolymer of the styrene-diolefin-styrene type is a diolefin selected from the group consisting of butadiene and isoprene.

9. The process set forth in claim 1 wherein said trunk copolymer does not substantially show an endothermic peak in differential scanning calorimetry and has a crystallinity determined by the X-ray diffraction method of 0%.

10. The process set forth in claim 1 wherein said esters (a) and (b) are alkyl and alkenyl esters, respectively.

11. The process set forth in claim 10 wherein the alkyl group in said esters (a) is an alkyl group having 1 to 18 carbon atoms.

12. The process set forth in claim 10 wherein the unsaturated monocarboxylic acid of the esters (a) is methacrylic acid.

13. The process of claim 10 wherein the alkenyl group in said esters (b) is an alkenyl group having 2 to 18 carbon atoms.

14. The process set forth in claim 13 wherein said alkenyl group is a vinyl group.

15. The process set forth in claim 10 wherein the saturated carboxylic acid of said esters (b) is an unsaturated carboxylic acid having 1 to 18 carbon atoms.

16. The process set forth in claim 15 wherein said saturated carboxylic acid is acetic acid.

17. The process of claim 1 wherein said epoxy compound (c) is a compound selected from the group consisting of glycidyl esters and glycidyl ethers.

18. The process set forth in claim 1 wherein said epoxy compound (c) is a compound selected from the group consisting of glycidyl acrylate, glycidyl methacrylate and allyl glycidyl ether.

19. The process set forth in claim 1 wherein the resulting product containing the oil-soluble graft copolymer is mixed with a lubricating oil to adjust the content of the graft copolymer to about 0.5 to about 40% by weight based on the weight of the lubricating oil.

20. A lubricating oil composition comprising a lubricating oil and about 0.5 to about 40% by weight, based on the weight of the lubricating oil, of an oil-soluble graft copolymer prepared by grafting in the presence of a radical initiator added thereto about $10^{-2}$ to about 5 milliquivalents, per gram of the oil-soluble copolymer formed, of a grafting monomer selected from the group consisting of (a) saturated esters of unsaturated monocarboxylic acids, (b) unsaturated esters of saturated carboxylic acids, and (c) unsaturated epoxy compounds to both said lubricating oil substrate and a trunk copolymer selected from the group consisting of copolymers of alpha-olefins having 2 to 20 carbon atoms, copolymers of styrene and alpha-olefins having 2 to 20 carbon atoms and hydrogenated products of copolymers of styrene and diolefins, said trunk copolymer having (i) a number average molecular weight of about 5,000 to about 100,000, (ii) a carbon-carbon double bond content determined from its iodine value of not more than about 0.1 milliequivalent/g of copolymer, and (iii) an oxygen content of not more than about 0.3% by weight.

* * * * *